United States Patent Office 3,448,576
Patented June 10, 1969

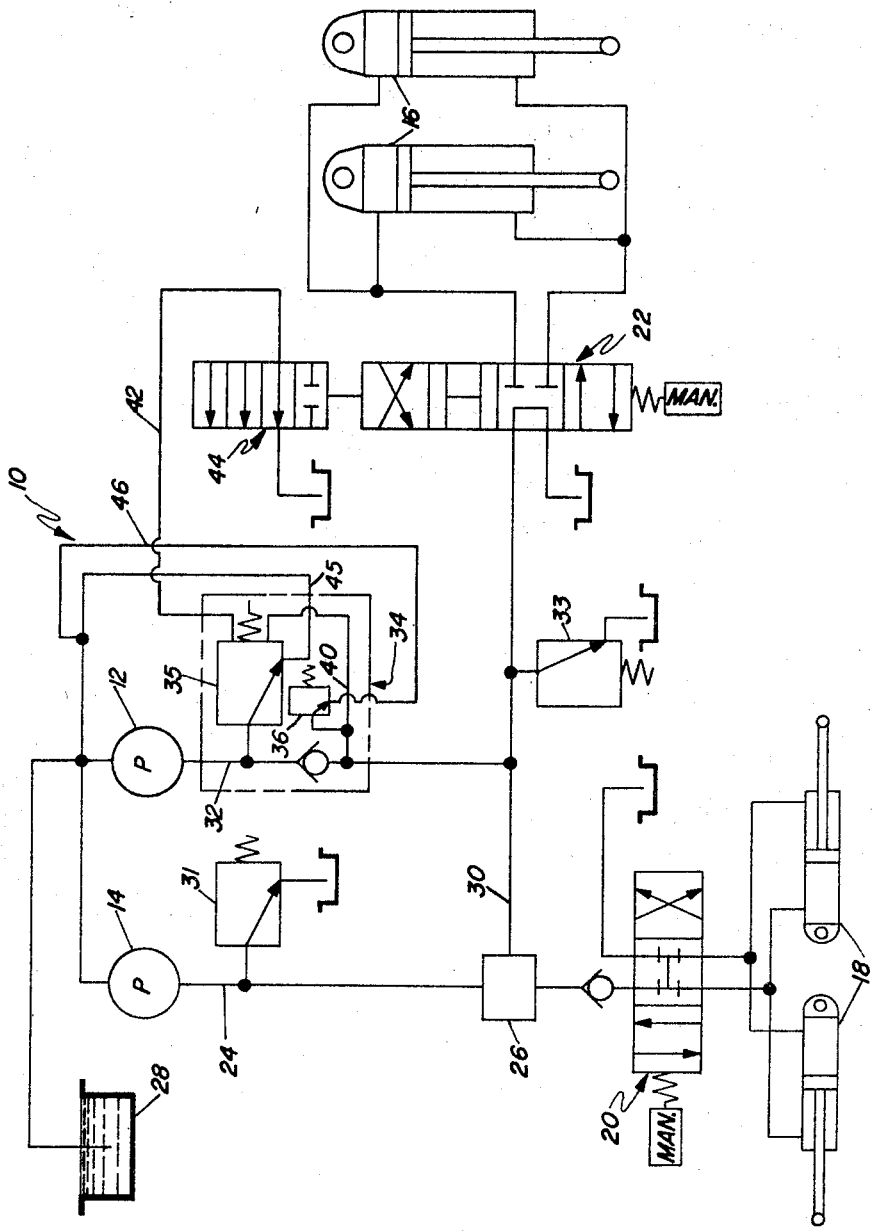

3,448,576
FLUID CONTROL SYSTEM
William H. Bechman, Morton, and Jack O. Winsor, Peoria, Ill., assignors to Westinghouse Air Brake Company, Peoria, Ill., a corporation of Pennsylvania
Filed Aug. 17, 1967, Ser. No. 661,417
Int. Cl. F15b *11/22*
U.S. Cl. 60—52                               10 Claims

ABSTRACT OF THE DISCLOSURE

A hydraulic system for a dump truck having hydraulic steering and hydraulic dump body lift assemblies, the system including a large output capacity pump for lifting the body and a small output capacity pump for steering and/or lifting the body. In addition to manual control and maximum pressure relief valves, a dump valve is provided to immediately return fluid from the large capacity pump only to the inlet side of the pump (1) upon dump body overload and (2) when the dump body lift is not being extended.

Field of invention

This invention relates to fluid control systems and, more specifically, to such systems for operating several independent vehicle components.

Description of the prior art

In large dump trucks, such as those of a 200 ton capacity, extraordinarily large hydraulic lift jacks are necessary to elevate a loaded dump body for unloading the same. To afford speed in dumping, large output hydraulic pumps may be provided to operate these lift jacks. Such pumps are usually constantly driven by the truck engine, the hydraulic fluid being merely recirculated back to the reservoir when the various hydraulic jacks are not being moved. However, because of the volume of fluid being moved and the size and length of hydraulic lines, substantial pressure drop occurs during such recirculation and engine horsepower is proportionally wasted.

Additionally, it is sometimes the case that, because of changes in material or because of truck operator inattention, the large capacity trucks are overloaded with material thereby imposing undesirable loads on the vehicle and the dump body lift system. Maximum pressure relief valves are usually employed to protect the hydraulic systems for the dump body, but if the maximum permissible pressure is exceeded, normal dumping of the payload is not possible.

Summary of invention

It is the general object of this invention to provide a fluid control system for operating several independent vehicle components that circumvents or minimizes the problems heretofore noted.

In achieving this general object, the present invention provides a fluid control system for a vehicle having two independently operable fluid motor assemblies, the system comprising a first pump of a first output capacity, and a second pump of a second output capacity. A first conduit for directing the output of the first pump to the first motor assembly is provided, the first conduit having first and second portions, the second portion being relatively longer than the first portion. A second conduit for directing the output of the second pump to both of said motor assemblies is also provided. A manually operable control valve is operatively interposed in the first and second conduits for controlling fluid flow to the first motor, and dump valve means is operably associated with the control valve and is interposed between said first and second portions of said first conduit for interrupting flow of fluid from the first pump to said second portion and returning it to the inlet side of the first pump when the first motor assembly is not being moved.

The dump valve means may further include pressure responsive means responsive to overload on the first motor assembly for interrupting the flow of fluid from the first pump to said second portion while permitting the flow of fluid from the second pump to said first motor assembly.

Brief description of the drawings

In describing the invention, reference will be made to the accompanying drawing in which:

The lone figure is a schematic illustration of a fluid control system according to the present invention for controlling vehicle steering and component lift assemblies schematically shown therein.

Detailed description of the invention

Referring to the drawing, a fluid control system 10 is shown for controlling fluid output from a pair of conventional hydraulic pumps 12 and 14 to the vehicle dump body lift and steering motor assemblies 16 and 18, respectively. Each assembly includes a plurality of hydraulic jacks. Conventional, manually operable, steering and dump body lift control valves 20 and 22, respectively, are provided. The dump body lift control valve 22 may be of a spool type including raise, lower, hold and float positions.

The hydraulic pumps 12 and 14 are adapted to be constantly driven by the vehicle engine, not shown. The first or dump body lift pump 12 may be of a relatively large output capacity, such as approximately 165 gallons per minute at normal engine operating speeds, while the second or steering pump is of a relatively smaller capacity, as, for example, 60 gallons per minute. It is to be understood that although the second pump 14 is designated a steering pump, a portion of the output of this pump may be directed to the dump body lift assembly 18 for moving the same. A fluid conduit 24 in which is positioned a flow divider 26 connects the pressure side of the pump 14 to the steering control valve 20 and a reservoir 28. The flow divider 26 is so constructed to assure that priority is given to the steering assembly and that an adequate volume of fluid will be directed to the steering control valve regardless of the demands placed on the system by the dump body lift assembly. In fluid communication with the flow divider 26 is a conduit 30 for directing a portion of the output of the pump 14 to the dump body lift control valve 22 and the dump body lift assembly 18. A maximum pressure relief valve 31, the setting of which may be, for example, 2500 p.s.i., is positioned in the conduit 24 for directing fluid therein to the reservoir 28 upon the generation of pressures exceeding the permissible level.

The dump body lift pump 12 is connected by a first conduit 32 to the dump body lift control valve 22, a maximum pressure relief valve 33, and the reservoir 28. The setting of the relief valve 33 may be the same as the relief valve 31. Positioned in the conduit 32 is an unloading relief valve assembly 34 for example, a valve manufactured by Vickers Incorporated and described in Evans United States Patent 2,807,274. The function of this latter valve in the present system forms the basis of this invention.

The unloading relief valve assembly 34 includes a dump valve 35 and is adapted to immediately return fluid from the pump 12 to the input side of the pump or the reservoir upon generation of an overload condition on the body lift assembly 18 or when this dump body lift assembly is not being extended. To accomplish this function the dump valve 35 is biased by a spring, not shown, to a closed position, opposite to that shown in the drawing, wherein the output of the pump 12 may be directed to the dump body control valve 22. In this position the outputs of both pumps 12 and 14 are available for dump body lift to provide a maximum flow and speed of operation at the most appropriate operational phase. A pilot line 40 connects the conduit 32 at a point downstream of the connection of the dump valve 35 so as to place the conduit 32 in fluid communication with a chamber, not shown, at the right hand side of the dump valve 35, which is connected to a vent line 42. Interposed in the vent line 42 is a vent line spool valve 44 mechanically connected to the dump body control valve 22 so as to move therewith. As schematically illustrated in the drawing, the vent line is in fluid communication with the reservoir 28 in every position of the dump body control valve 22 except when this latter valve is in the "raise" position. In this latter position the vent line 42 is blocked.

The construction of the unloading relief valve assembly 34 is such that pressure of fluid in the conduit 32 acting upon the dump valve 35 is greater than the opposing pressure in the pilot line chamber and the spring bias acting on the opposite side of the valve in all positions of the dump body control valve 22 except "raise." This is because the pilot line chamber is connected by the open vent line 42 to the reservoir 28. In other than the raise condition, the valve 35 is moved to the open position, as shown in the drawing, and the output of the pump 12 is immediately directed to the inlet side of the pump 12 by a conduit 45. Therefore the pump 12 is unloaded. However, upon movement of the control valve 22 to the raise position, the vent line 42 is blocked by the vent line valve 44, pressure in the pilot line chamber balances the pressure in the conduit 32, and the spring bias moves the dump valve 35 to the closed position.

It should be appreciated that while the first portion of the fluid conduit 32 between the pump 12 and the unloading relief valve assembly 34 is schematically illustrated as being relatively close in length to the second portion of that conduit between valve assembly 34 and the reservoir, in practice the second portion is of a much greater length or generates a much higher pressure drop should fluid be constantly recirculated therein. For this reason substantial engine power waste, which is proportional to pressure drop, is circumvented by interrupting the flow of fluid from the pump 12 and returning it to the pump inlet prior to its entry into the second portion of this conduit. Advantageously however, speed of initial operation is not hampered nor maintenance problems provoked as the output of the small capacity pump is constantly recirculated.

The present invention further includes provision for conveniently reducing the possibility that a truck operator will operate the dump body assembly in an overloaded condition. To achieve this function, the unloading relief valve assembly 34 further includes a port in which is positioned a maximum pressure relief valve 36, the tripping pressure of which may be approximately 2,000 p.s.i. but in any case is less than the maximum pressure relief setting of the maximum pressure relief valves 31 and 33. The relief valve 36 is in fluid communication with the pilot line chamber and is connected by a drain line 46 to the inlet side of the pump 12. For this reason, upon generation of pressures in advance of 2,000 p.s.i., the valve 35 is moved to connect the pilot line chamber to the drain line 46 in which condition the pressure exerted by the pilot line chamber and spring bias upon the valve 35 will not be as great as the pressure in the conduit 32 acting to open the same whereby the valve 35 will be moved to an open condition and fluid from the pump 12 will be immediately directed to the input side of the pump. In this manner, should the dump body lift assembly be placed under an overload sufficient to generate 2,000 p.s.i. but not sufficient to generate 2,500 p.s.i. at which the relief valves 31 and 33 are tripped, only the output of the small steering pump 14 may be utilized to extend the jacks of the dump body lift assembly.

This construction is particularly beneficial for the following reason. Because the capacity of the steering pump 14 is relatively small, operation of the dump body lift assembly 18 will be substantially slower than when operated by both pumps. For example, time required to fully elevate the body might be increased from approximately 30 seconds to approximately two minutes. Such slowness of operation acts as a deterrent to operators who might otherwise ignore whether or not the dump body is overloaded. Additionally, this operational advantage is made available without a complete operational bar as would be the case if the relief valves 31 and 33 were tripped by overload.

In describing the present fluid control system, reference has been made to but a single preferred embodiment. It should be appreciated by one skilled in the art that various additions, deletions and modifications may be made which fall into the scope of the present invention which is to be ascertained from the following claims.

What is claimed is:

1. A vehicle having a dump body and steerable wheels, first and second fluid motor assemblies for independently controlling said body and said wheels, each of said assemblies including at least one fluid motor, and a control for said assemblies, said control comprising:

a first pump of a first output capacity;

a second pump of a second output capacity;

a first conduit means for directing the output of said first pump to said first fluid motor assembly for operating the same, said first conduit means including first and second portions, said second portion being relatively longer than said first portion;

second conduit means for directing the output of said second pump to said second motor assembly;

manually operable control valve means operatively connected to said first and second conduit means for controlling fluid flow to said first motor assembly; and dump valve means operatively connected to said control valve means and interposed between said first and second portions of said first conduit means for interrupting the flow of fluid from said first pump in said first conduit means and returning said fluid to the inlet side of said first pump when said first motor assembly is not being extended, said dump valve means permitting the flow of fluid from said second pump to said first motor assembly.

2. A vehicle according to claim 1 wherein said dump valve means further includes pressure responsive means for interrupting the flow of fluid from said first pump in said first conduit means and returning said fluid to the inlet side of said first pump, said dump valve means being responsive to overload on the first motor assembly but permitting the flow of fluid from said second pump to said first motor assembly.

3. A vehicle according to claim 2 wherein the output capacity of said first pump is substantially greater than that of the second pump.

4. A vehicle according to claim 3 wherein said first and second conduit means further includes maximum pressure relief valve means, the maximum permissible pressure permitted thereby being greater than the pressure permitted by said pressure responsive means of said dump valve means.

5. A vehicle according to claim 4 wherein said manually operable control valve means is movable through raise, lower, float, and hold positions and said dump valve means is operable to interrupt the flow of fluid from said first pump and return said fluid to the inlet side of said first pump in the down, float, and hold positions of said manually operable control valve means.

6. A vehicle according to claim 5 wherein said second conduit means includes flow divider means to proportionalize flow from said second pump between said first and second motor assemblies.

7. A vehicle according to claim 5 wherein said dump valve means further includes a dump valve, a pilot conduit leading from said first conduit to said dump valve, a spool valve mechanically connected to said control valve means for movement therewith, said spool valve positioned in a vent line from said dump valve and said pilot conduit.

8. A vehicle having first and second independently operable fluid motor assemblies, each of said assemblies including at least one fluid motor, and a control for said assemblies, said control comprising:
   a first pump of a first output capacity;
   a second pump of a second output capacity;
   first conduit means for directing the output of said first pump to said first fluid motor assembly for operating the same, said first conduit means including first and second portions, said second portion adapted to cause a greater pressure drop of fluid moving therethrough than said first portion;
   second conduit means for directing the output of said second pump to said second motor assembly;
   manually operable control valve means operatively connected to said first and second conduit means for controlling fluid flow to said first motor assembly;
   dump valve means operatively connected to said control valve means and interposed between said first and second portions of said first conduit means for interrupting the flow of fluid from said first pump in said first conduit means and returning said fluid to the inlet side of said first pump when said first motor assembly is not being extended, said dump valve means permitting the flow of fluid from said second pump to said first motor assembly.

9. A vehicle according to claim 8 wherein the output of said first pump is substantially greater than that of the second pump.

10. A vehicle having first and second independently operable fluid motor assemblies, each of said assemblies including at least one fluid motor, and a control for said assemblies, said control comprising:
    a first pump of a first output capacity;
    a second pump of a second output capacity;
    first conduit means for directing the output of said first pump to said first fluid motor assembly for operating the same;
    second conduit means for directing the output of said second pump to said second motor assembly;
    manually operable control valve means operatively connected to said first and second conduit means for controlling fluid flow to said first motor assembly;
    pressure responsive dump valve means interposed in said first conduit means for interrupting the flow of fluid from said first pump in said first conduit means and returning said fluid to the inlet side of said first pump, said dump valve means being responsive to overload on the first motor assembly but permitting the flow of fluid from said second pump to said first motor assembly.

References Cited

UNITED STATES PATENTS

| | | | |
|---|---|---|---|
| 2,643,516 | 6/1953 | Carlson | 60—52 |
| 2,960,829 | 11/1960 | Ross. | |
| 3,142,962 | 8/1964 | Lohbauer. | |
| 3,146,593 | 9/1964 | Stacey. | |
| 3,156,098 | 11/1964 | La Rou. | |
| 3,183,977 | 5/1965 | Heckenkamp et al. | |

EDGAR W. GEOGHEGAN, *Primary Examiner.*